United States Patent [19]

Burton et al.

[11] 3,721,678
[45] March 20, 1973

[54] 2-TRIFLUOROMETHYL-OR 2-PENTAFLUOROETHYLBENZIMIDAZOLE

[76] Inventors: Dennis Ernest Burton, Frog Cottage, South Street, Ickleton, Saffron Walden, Essex; Geoffrey Tattersall Newbold, Glen Orchy, Rookery Lane, Wendens Ambo, Saffron Walden, Essex; Albert Percival, "Northumbria", The Lane, Hauxton, Cambridgeshire; Alan James Lambie, 78 Habberley Road, Kinderminster, Worchestershire; Ian Robert Sencial, 6 Cleves Drive, Rubery, Worchestershire, all of England

[22] Filed: April 17, 1967

[21] Appl. No.: 631,175

Related U.S. Application Data

[63] Continuation-in-part of Ser. No. 457,519, May 20, 1965, abandoned.

[30] Foreign Application Priority Data

May 27, 1964  Great Britain......................21,845/64
April 23, 1966  Great Britain......................17,876/66

[52] U.S. Cl. ................260/309.2, 71/92, 260/247.1, 260/247.2 B, 260/247.5 B, 260/268 BC, 260/293.6, 260/294.8 C, 260/294.9, 260/295 F, 424/248, 424/250, 424/263, 424/267, 424/273
[51] Int. Cl. .............................................C07d 49/38
[58] Field of Search....................................260/309.2

[56] References Cited

OTHER PUBLICATIONS

Grimaldi et al Jour. Org. Chem. Vol. 27, Pages 227–9 (1962)

Morgan Jour. Chem. Soc. (London) 1961, Pages 2344–2345.

*Primary Examiner*—Natalie Trousoe
*Attorney*—Wenderoth, Lind & Ponack

[57] ABSTRACT

The invention provides physiologically active compounds of the formula

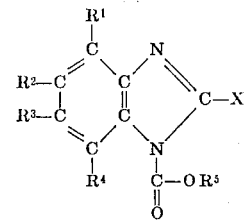

wherein the above formula X is selected from the group consisting of trifluoromethyl and pentafluoroethyl, and $R^1$, $R^2$, $R^3$ and $R^4$ are selected from the group consisting of hydrogen, alkyl, hydroxy, alkoxy, nitro, halogen, pseudo-halogen, substituted alkyl, carboxy, carboxy ester, carboxy amide, N-substituted carboxy amide, N-disubstituted carboxy amide, amino monosubstituted amino, disubstituted amino, thiol, alkylthiol and oxygenated derivatives thereof, sulphonic acid, ester and amide, substituted amide, and a heterocyclic ring attached to the benzimidazole system through a nitrogen atom, radicals and $R^5$ is selected from the group consisting of alkyl, substituted alkyl, aryl, substituted aryl, cycloalkyl and substituted cycloalkyl radicals. Also disclosed are physiologically active compositions containing the substituted benzimidazole compounds as an active ingredient as well as methods for the treatment of plants, materials, the soil, land or aquatic areas which comprises applying thereon or thereto a physiologically active composition as defined.

11 Claims, No Drawings

2-TRIFLUOROMETHYL-OR 2-PENTAFLUOROETHYLBENZIMIDAZOLE

The present application is a continuation-in-part of copending application Ser. No. 457,519 filed on May 20, 1965, now abandoned.

The present invention relates to certain substituted benzimidazoles which have been found to possess physiological activity, to their preparation and to agricultural chemical and related compositions containing the same.

It has been found that the substituted benzimidazoles as hereinafter described are active as pesticides in many fields and that certain members are highly active as herbicides, acaricides, insecticides, molluscicides, fungicides and bactericides.

Accordingly the present invention is for a physiologically active composition which contains as an active ingredient a substituted benzimidazole of the following formula:

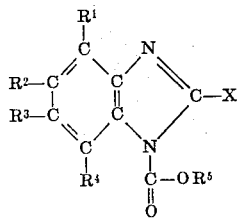

wherein the above formula $R^1$, $R^2$, $R^3$ and $R^4$ may be the same or different and are selected from the group comprising hydrogen, alkyl (for example of one to six carbon atoms such as methyl, ethyl or propyl), hydroxy, alkoxy (for example methoxy, ethoxy, or butoxy), nitro, halogen (for example chloro, bromo or fluoro), pseudo-halogen (for example cyano, thiocyano, isothiocyano or azido), substituted alkyl (for example trifluoromethyl, chloromethyl, bromomethyl, trichloromethyl, hydroxy-methyl, 2-chloroethyl, 2-hydroxyethyl or 2-methoxyethyl), carboxy, carboxy ester, carboxy amide, N-substituted carboxy amide, N-disubstituted carboxy amide, amino or mono or disubstituted amino (for example methylamino dimethylamino acetylamino, trifluoroacetylamino, benzenesulphonamido, paratoluene-sulphonamido, methanesulphonamido) thiol, alkylthiol and oxygenated derivatives thereof (for example, —$SOR^6$ or —$SO_2R^6$ where $R^6$ is alkyl) sulphonic acid and esters and amides thereof and substituted amides (for example phenylsulphamyl, ethylsulphamyl, chloroethylsulphamyl) and a heterocyclic ring attached to the benzimidazole system through a nitrogen atom (for example morpholine, pyridine, piperidine, piperazine, N'-alkyl or N'-aryl piperazine), radicals, where $R^5$ is trifluoromethyl or pentafluoroethyl, and where $R^5$ is alkyl (for example methyl, ethyl, hexyl, decyl or dodecyl), substituted alkyl (for example chloromethyl or bromoethyl), aryl (for example phenyl or naphthyl), substituted aryl (for example tolyl or xylyl), cycloalkyl or substituted cycloalkyl.

The present invention is also for a physiologically active composition which contains a substituted benzimidazole as identified above and at least one material selected from the group comprising wetting agents, inert diluents and solvents.

The present invention is also for a composition suitable for use as a molluscicide which comprises the substituted benzimidazole as identified above admixed with appropriate carriers. Appropriate carriers include solid diluents, edible substances attractive to molluscs and paints, for example suitable for marine application.

The present invention is also for the treatment of plants, materials, the soil, land or aquatic areas, which comprises applying thereon or thereto a physiologically active composition as defined above. The materials treated according to the invention may be any material susceptible to attack by detrimental organisms such as fabric, paper and wood.

The present invention also comprises the new substituted benzimidazoles of the formula:

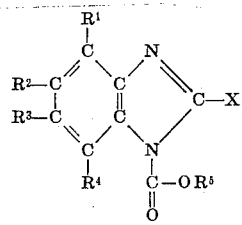

wherein the above formula, the groups $R^1$, $R^2$, $R^3$, $R^4$, $R^5$ and X have the significance indicated above.

It has been found that the substituted benzimidazoles according to the invention generally possess physiological activity. Many of these compounds are useful as molluscicides, or as insecticides, or as herbicides, or as fungicides, or as acaricides.

According to a preferred embodiment, the present invention is for compounds of the formula:

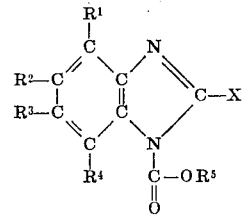

wherein $R^1$, $R^2$, $R^3$, $R^4$ and $R^5$ have the significance indicated above but where at least one of the groups $R^1$, $R^2$, $R^3$ and $R^4$ is chlorine, bromine, iodine, fluorine, nitro, amino alkyl or trifluoromethyl, suitably also where $R^5$ is alkyl or phenyl.

According to a preferred embodiment of the invention, the substituted benzimidazole is:

5,6-dichloro-1-phenoxycarbonyl-2-trifluoromethylbenzimidazole,
4-bromo-6-chloro-1-ethoxycarbonyl-2-trifluoromethylbenzimidazole,
4,6-dibromo-1-isopropoxycarbonyl-2-trifluoromethylbenzimidazole,
6-bromo-4-chloro-1-ethoxycarbonyl-2-trifluoromethylbenzimidazole,
6-bromo-4,5-dichloro-1-isopropoxycarbonyl-2-trifluoromethylbenzimidazole,
4-bromo-6-chloro-1-isopropoxycarbonyl-2-trifluoromethylbenzimidazole,
5-cyano-1-isopropoxycarbonyl-2-trifluoromethylbenzimidazole,
6-bromo-4,5-dichloro-1-ethoxycarbonyl-2-trifluoromethylbenzimidazole,
5,6-dichloro-1-ethoxycarbonyl-2-trifluoromethylbenzimidazole,
5,6-dichloro-1-methoxycarbonyl-2-trifluoromethylbenzimidazole,
6-chloro-4-nitro-1-ethoxycarbonyl-2-trifluoromethylbenzimidazole, 4-chloro-6-iodo-1-ethoxycarbonyl-2-trifluoromethyl-benzimidazole,
5,6-dichloro-1-cyclohexyloxycarbonyl-2-trifluoromethylbenzimidazole,
6-bromo-4,5-dichloro-1-(2'-chloroethoxycarbonyl)-2-trifluoromethyl-benzimidazole,
4,5-dichloro-1-methoxycarbonyl-2-trifluoromethyl-benzimidazole,
4,5-dichloro-1-cyclohexyloxycarbonyl-2-trifluoromethylbenzimidazole,
4,5,6-trichloro-1-cyclohexyloxycarbonyl-2-trifluoromethylbenzimidazole,
4,5-dichloro-1-hexyloxycarbonyl-2-trifluoromethyl-benzimidazole,
4,5,6-trichloro-1-alphanaphthyloxycarbonyl-2-trifluoromethylbenzimidazole,
4,6-dichloro-1-phenoxycarbonyl-2-trifluoromethyl-benzimidazole,
4-bromo-5,6-dichloro-1-ethoxycarbonyl-2-trifluoromethylbenzimidazole,
4-bromo-5,6-dichloro-1-pentyloxycarbonyl-2-trifluoromethylbenzimidazole,
4-bromo-5,6-dichloro-1-propyloxycarbonyl-2-trifluoromethylbenzimidazole,
6-chloro-4-nitro-1-decyloxycarbonyl-2-trifluoromethylbenzimidazole,
6-chloro-4-nitro-1-isopropoxycarbonyl-2-trifluoromethylbenzimidazole,
4,5-dichloro-1-ethoxycarbonyl-2-trifluoromethyl-benzimidazole,
4,5-dichloro-1-isopropoxycarbonyl-2-trifluoromethyl-benzimidazole,
5-nitro-1-isopropoxycarbonyl-2-trifluoromethyl-benzimidazole,
4,6-dibromo-1-ethoxycarbonyl-2-trifluoromethyl-benzimidazole and
4-bromo-6-chloro-1-phenoxycarbonyl-2-trifluoromethylbenzimidazole.

According to one embodiment of the invention, the substituted benzimidazoles as indicated are prepared by reacting an alkali metal salt of the corresponding benzimidazole derivative with a chloroformate, in accordance with the following formula:

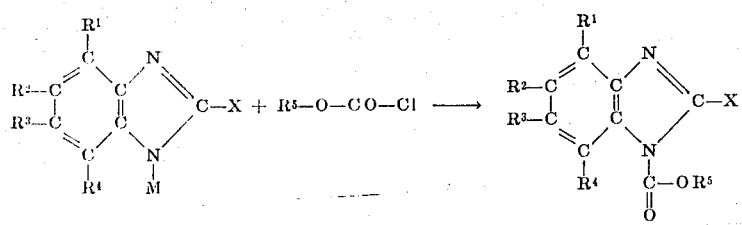

wherein the above formula $R^1$, $R^2$, $R^3$, $R^4$, $R^5$ and X have the significance indicated above and M is an alkali metal.

Alternatively the substituted benzimidazoles may be prepared by reacting the corresponding benzimidazole derivative with the appropriate chloroformate in the presence of a base, such as trimethylamine or triethylamine.

In the case of the substituted benzimidazoles bearing an amino group, these are suitably prepared by the reaction of the corresponding nitro-substituted benzimidazole. In the case of the substituted benzimidazoles bearing a nitro group, these are suitably prepared by the nitration of the corresponding substituted benzimidazole.

The substituted benzimidazole may be incorporated into physiologically active compositions, in any of the usual ways, with or without wetting agents and inert diluents.

If desired the substituted benzimidazoles may be dissolved in a water immiscible solvent, such as for example a high boiling hydrocarbon, suitably containing dissolved emulsifying agents so as to act as a self-emulsifiable oil on addition to water.

The substituted benzimidazoles may also be admixed with a wetting agent with or without an inert diluent to form a wettable powder which is soluble or dispersible in water, or may be mixed with the inert diluent to form a solid or powdery product.

Inert diluents with which the substituted benzimidazoles and salts thereof may be incorporated include solid inert media comprising powdered or divided solid materials, for example, clays, sands, talc, mica, fertilizers and the like, such products either comprising dust or larger particle size materials.

The wetting agents used may comprise anionic compounds such as for example soaps, fatty sulphate esters such as dodecyl sodium sulphate, fatty aromatic sulphonates such as alkyl-benzene sulphonates or butyl naphthalene sulphonate, more complex fatty sulphonates such as the amide condensation product of oleic acid and N-methyl taurine or the sodium sulphonate of dioctyl succinate.

The wetting agents may also comprise non-ionic wetting agents such as for example condensation products of fatty acids, fatty alcohols or fatty substituted phenols with ethylene oxide, or fatty esters of sugars or polyhydric alcohols, or the products obtained from the latter by condensation with ethylene oxide, or the products known as block copolymers of ethylene oxide and propylene oxide. The wetting agents may also comprise cationic agents such as for example cetyl trimethyl-ammonium bromide and the like.

For molluscicidal use the benzimidazole may for example be made into a granule or pellet, for example, of plaster of paris, which may be scattered in an aquatic habitat of the molluscs, and from which the benzimidazole may diffuse, or dissolved into a spreading oil such as diesel or lubricating oil containing a spreading agent such as oleic acid, which may be applied to the water surface. The present invention also comprises a process for the treatment of water to purify this by the destruction of aquatic molluscs which comprises adding to the water the benzimidazoles according to the invention.

Edible substances attractive to molluscs with which the benzimidazoles may be admixed include fungi, oilcake, fruit waste, lucerne flour, cereals, cereal products, vegetables, vegetable products, bran, biscuits and the like. The physiologically active compositions according to the present invention may contain in addition to the substituted benzimidazole or salts thereof, other physiologically active materials such as herbicides, insecticides, fungicides and molluscides. Insecticidal compositions may contain edible substances attractive to insects such as sugar, molasses and protein hydrolysates, suitably also with specific insect attractants.

The substituted benzimidazoles find particular use as acaricides, and a special feature of the invention is their use as acaricides, and acaricidal compositions containing the same. Substituted benzimidazoles which are of especial value as acaricides include:
5,6-dichloro-1-phenoxycarbonyl-2-trifluoromethyl-benzimidazole,
4-bromo-6-chloro-1-ethoxycarbonyl-2-trifluoromethylbenzimidazole,
4,6-dibromo-1-isopropoxycarbonyl-2-trifluoromethyl-benzimidazole,
6-bromo-4-chloro-1-ethoxycarbonyl-2-trifluoromethylbenzimidazole and
6-bromo-4,5-dichloro-1-isopropoxycarbonyl-2-trifluoromethylbenzimidazole.

The substituted benzimidazoles may be used as acaricides in any of the conventional ways, such as the control of mites on plants, the control of mites on or in stored products of vegetable or animal origin such as grain, and the control of mites, such as ticks, on living animals.

The acaricidal compositions according to the present invention may contain in addition to the substituted benzimidazole or salts thereof, other physiologically active materials such as herbicides, insecticides, fungicides and molluscides.

The following examples are given to illustrate the present invention; the parts and percentages are by weight unless otherwise indicated.

EXAMPLE 1

Twenty-nine grams of 4,5,6-trichloro-2-trifluoromethylbenzimidazole were dissolved by warming in a mixture of 290 milliliters of benzene and 10 milliliters of absolute ethanol. A solution of 2.3 grams of sodium in 50 milliliters of dry ethanol was then added dropwise to the stirred warmed solution. After heating for a further 30 minutes, the solvents were removed in vacuo and the residue taken up in 200 milliliters of dry acetone. This solution was then treated with an acetone solution of 10.9 grams of ethylchloroformate and finally heated at reflux, with stirring for 1 hour. After allowing to cool, the reaction mixture was filtered to remove the deposited salt. The filtrate and acetone washings were concentrated to about 50 milliliters, when a crystalline solid separated on cooling. This solid was filtered off and recrystallized, after drying, from ligroin to give carbethoxy-4,5,6(5,6,7-tri-chloro-2-trifluoromethylbenzimidazole as a colorless product (21.5 g., 60 percent), melting point 116°–118°C.
Analysis:
$C_{11}H_6Cl_3F_3N_2O_2$ requires: C, 36.54; H, 1.67; Cl, 29.42; N, 7.75%
found: C, 36.50; H, 1.50; Cl, 29.35; N, 7.70%

EXAMPLE 2

7.8 grams of phenyl chloroformate in 10 milliliters of dry acetone was added dropwise to a mixture of 10.4 grams of 2,5-bis-trifluoromethylbenzimidazole, 6.1 milliliters of triethylamine and 70 milliliters of dry acetone. The temperature increased from 20° to 38° during the addition. Finally the mixture was refluxed for 1 hour. The triethylamine hydrochloride was filtered off and washed with dry acetone. The filtrate and washings were concentrated and kept at 0° for 24 hours. The crystalline material was filtered off, dried and recrystallized twice from ethanol to give 7.6 grams of white needles of 1-carbophenoxy-2,5-bis-trifluoromethylbenzimidazole (melting point 84°–86°).
Analysis:
$C_{16}H_8F_6N_2O_2$ requires: C, 51.35; H, 2.16; F, 30.46; N, 7.49%
found: C, 51.50; H, 2.25; F, 30.25; N, 7.75%

EXAMPLES 3–53

The following compounds were prepared by analogous methods to those of Examples 1 and 2.
3. 4,5,6-trichloro-1-methoxycarbonyl-2-trifluoromethylbenzimidazole, melting point 153°–154°C.
4. 5,6-dichloro-1-ethoxycarbonyl-4-nitro-2-trifluoromethylbenzimidazole, melting point 113°C.
5. 4,5,6-trichloro-1-isopropoxycarbonyl-2-trifluoromethylbenzimidazole, melting point 134°–135°C.
6. 1-isopropoxycarbonyl-2,5-bis-trifluoromethyl-benzimidazole, melting point 63°C.
7. 6-chloro-1-isopropoxycarbonyl-4-nitro-2-trifluoromethylbenzimidazole, melting point 125°–126°C.
8. 1-phenoxycarbonyl-2-trifluoromethyl-benzimidazole, melting point 58°C.
9. 5-methyl-1-phenoxycarbonyl-2-trifluoromethyl-benzimidazole, melting point 99°–100°C.
10. 4-chloro-1-phenoxycarbonyl-2-trifluoromethyl-benzimidazole, melting point 71°–72°C.
11. 5-bromo-1-phenoxycarbonyl-2-trifluoromethyl-benzimidazole, melting point 71°–72°C.
12. 5-iodo-1-phenoxycarbonyl-2-trifluoromethyl-benzimidazole, melting point 103°–105°C.
13. 5,6-dimethyl-1-phenoxycarbonyl-2-trifluoromethylbenzimidazole, melting point 114°C.
14. 5,6-dichloro-1-phenoxycarbonyl-2-trifluoromethylbenzimidazole, melting point 103°C.
15. 4-chloro-6-nitro-1-phenoxycarbonyl-2-trifluoromethylbenzimidazole, melting point 154°–156°C.
16. 6-chloro-4-nitro-1-phenoxycarbonyl-2-trifluoromethylbenzimidazole, melting point 119°–121°C.
17. 4,5,6-trichloro-1-phenoxycarbonyl-2-trifluoromethylbenzimidazole, melting point 138°–140°C.
18. 5-bromo-1-ethoxycarbonyl-2-trifluoromethyl-benzimidazole, melting point 63°–65°C.
19. 4,5-dichloro-1-ethoxycarbonyl-2-trifluoromethylbenzimidazole, melting point 109°–110°C.
20. 4,5-dichloro-1-isopropoxycarbonyl-2-trifluoromethylbenzimidazole, melting point 94°–95C.

21. 1-isopropoxycarbonyl-5-nitro-2-trifluoromethyl-benzimidazole, melting point 72°–74°C.
22. 6-bromo-4-chloro-1-ethoxycarbonyl-2-trifluoromethylbenzimidazole, melting point 93°–94C.
23. 6-bromo-4,5-dichloro-1-isopropoxycarbonyl-2-trifluoromethylbenzimidazole, melting point 130°–131°C.
24. 5-bromo-1-isopropoxycarbonyl-2-trifluoromethylbenzimidazole, melting point 74°–75C.
25. 4,6-dibromo-1-ethoxycarbonyl-2-trifluoromethylbenzimidazole, melting point 112°–114°C.
26. 1-ethoxycarbonyl-5-nitro-2-trifluoromethyl-benzimidazole, melting point 85°–87°C.
27. 4,5-dichloro-1-phenoxycarbonyl-2-trifluoromethylbenzimidazole, melting point 113°–114°C.
28. 4-bromo-6-chloro-1-ethoxycarbonyl-2-trifluoromethylbenzimidazole, melting point 115°–117°C.
29. 1-ethoxycarbonyl-5-iodo-2-trifluoromethyl-benzimidazole, melting point 67°C.
30. 4-bromo-1-ethoxycarbonyl-6-nitro-2-trifluoromethylbenzimidazole, melting point 152°–153°C.
31. 4,6-dibromo-1-isopropoxycarbonyl-2-trifluoromethylbenzimidazole, melting point 137°–138°C.
32. 4-bromo-6-chloro-1-phenoxycarbonyl-2-trifluoromethylbenzimidazole, melting point 122°–124°C.
33. 6-bromo-4-chloro-1-ethoxycarbonyl-2-trifluoromethylbenzimidazole, off-white crystals, melting point 93°–94°C.
34. 6-bromo-4,5-dichloro-1-isopropoxycarbonyl-2-trifluoromethyl-benzimidazole, off-white crystals, melting point 130°–131°C.
35. 4-bromo-6-chloro-1-isopropoxycarbonyl-2-trifluoromethyl-benzimidazole, melting point 142°–144°C.
36. 5-cyano-1-isopropoxycarbonyl-2-trifluoromethylbenzimidazole, melting point 80°–82C.
37. 6-bromo-4,5-dichloro-1-ethoxycarbonyl-2-trifluoromethyl-benzimidazole, melting point 119°–122°C.
38. 5,6-dichloro-1-ethoxycarbonyl-2-trifluoromethylbenzimidazole, melting point 101°C.
39. 5,6-dichloro-1-methoxycarbonyl-2-trifluoromethylbenzimidazole, melting point 141°C.
40. 6-chloro-4-nitro-1-ethoxycarbonyl-2-trifluoromethylbenzimidazole, melting point 71°–73C.
41. 4-chloro-6-iodo-1-ethoxycarbonyl-2-trifluoromethylbenzimidazole, melting point 93°–95C.
42. 5,6-dichloro-1-cyclohexyloxycarbonyl-2-trifluoromethylbenzimidazole, melting point 79°–80C.
43. 6-bromo-4,5-dichloro-1-(2'-chloroethoxycarbonyl)-2-trifluoromethyl-benzimidazole, melting point 135°–137°C.
44. 6-chloro-4-nitro-1-decyloxycarbonyl-2-trifluoromethylbenzimidazole, melting point 58°–59C.
45. 4,5-dichloro-1-methoxycarbonyl-2-trifluoromethylbenzimidazole, melting point 111°–112°C.
46. 4,5-dichloro-1-cyclohexyloxycarbonyl-2-trifluoromethylbenzimidazole, melting point 87°–88C.
47. 4,5,6-trichloro-1-cyclohexyloxycarbonyl-2-trifluoromethyl-benzimidazole, melting point 114°–115°C.
48. 4,5-dichloro-1-hexyloxycarbonyl-2-trifluoromethylbenzimidazole, melting point 62°–63C.
49. 4,5,6-trichloro-1-alpha-naphthyloxycarbonyl-2-trifluoromethyl-benzimidazole, melting point 175°–176°C.
50. 4,6-dichloro-1-phenoxycarbonyl-2-trifluoromethylbenzimidazole, melting point 115°–116°C.
51. 4-bromo-5,6-dichloro-1-ethoxycarbonyl-2-trifluoromethylbenzimidazole, melting point 142°–143°C.
52. 4-bromo-5,6-dichloro-1-pentyloxycarbonyl-2-trifluoromethyl-benzimidazole, melting point 93°–95C.
53. 4-bromo-5,6-dichloro-1-propyloxycarbonyl-2-trifluoromethyl-benzimidazole, melting point 123°–125°C.

EXAMPLE 54

Suspensions of the compounds according to the invention were made up in aqueous acetone containing 5 percent of the active ingredient. These suspensions were diluted with aerated distilled water to give compositions containing 10, 3, 1 and 0.3 parts per million (ppm) of the active ingredient. 100 milliliter aliquots of the composition were placed in screw-cap glass jars, 4.5 centimeters diameter by 8.5 centimeters high, which just filled them to the brim. Five young specimens of the bilharzia vector snail, *Australorbis glabratus*, were then placed in each vessel and a perforated lid screwed on to prevent them leaving the water. The temperature was maintained at 28°C. After a 24 hour exposure period the snails were removed from the solutions of the compounds and placed in aerated distilled water for a further 48 hour recovery period before an assessment of mortality was made. The results obtained are summarized in the following table, each value being the average of three replications.

| | % mortality after 72 hours | | | |
|---|---|---|---|---|
| | 10 ppm. | 3 ppm. | 1 ppm. | 0.3 ppm. |
| 1-carbo-isopropoxy-4,5,6(5,6,7)-trichloro-2-trifluoromethyl-benzimidazole | 100 | 100 | 100 | 70 |
| 1-carbethoxy-4,5,6(5,6,7)-trichloro-2-trifluoromethyl-benzimidazole | 100 | 100 | 100 | 80 |
| 1-carbophenoxy-4,5,6(5,6,7)-trichloro-2-trifluoromethyl-benzimidazole | 100 | 100 | 100 | 100 |
| 1-carbomethoxy-4,5,6(5,6,7)-trichloro-2-trifluoromethyl-benzimidazole | 100 | 100 | 100 | 40 |

EXAMPLE 55

Mustard, linseed, buckwheat and sugarbeet were grown in John Innes No. 1 potting compost in aluminum pans (18 × 9 × 4 cm.) When the plants had between 2 and 5 true leaves they were sprayed with a solution of each of the compounds identified below in aqueous acetone at rates corresponding to 160, 80, 40 and 20 ounces per acre. After 7 days in a controlled environment room at 22°C. with 14 hours per day illumination of 800 ft. candles and at 75–90 percent relative humidity, the plants were assessed visually for any herbicidal effect. The results are tabulated below; 100 indicates complete destruction of the plant; 0 indicates no herbicidal effect.

| Compound | Rate of application, oz/acre | Herbicidal effect | | | |
|---|---|---|---|---|---|
| | | mustard | linseed | Buckwheat | Sugarbeet |
| 1-Carboethoxy-2-trifluoro-methyl-4,5,6(5,6,7)-trichlorobenzimidazole | 60 | 100 | 100 | 100 | 100 |
| | 30 | 100 | 100 | 100 | 100 |
| | 40 | 95 | 100 | 100 | 95 |
| | 20 | 75 | 100 | 100 | 60 |
| 1-Carboisopropoxy-2-trifluoromethyl-4,5,6(5,6,7)-trichlorobenzimidazole | 60 | 98 | 100 | 100 | 100 |
| | 80 | 85 | 100 | 100 | 90 |
| | 40 | 85 | 90 | 90 | 65 |
| | 20 | 75 | 90 | 80 | 15 |
| 1-Carbophenoxy-2-trifluoro-methyl-4,5,6(5,6,7)-trichlorobenzimidazole | 60 | 100 | 90 | 100 | 100 |
| | 80 | 70 | 90 | 100 | 100 |
| | 40 | 70 | 85 | 100 | 70 |
| | 20 | 50 | 70 | 95 | 35 |
| 1-Carbomethoxy-2-trifluoro-methyl-4,5,6(5,6,7)-trichlorobenzimidazole | 60 | 95 | 100 | 100 | 100 |
| | 80 | 90 | 100 | 100 | 100 |
| | 40 | 80 | 100 | 100 | 100 |
| | 20 | 80 | 95 | 100 | 75 |
| 1-Carbophenoxy-2,5-bis-(trifluoromethyl) benzimidazole | 160 | 100 | 100 | 100 | 100 |
| | 20 | 100 | 100 | 100 | 100 |
| | 2.5 | 84 | 95 | 100 | 85 |
| 1-Carbophenoxy-2-trifluoro-methyl-4-chloro-6-nitro benzimidazole | 160 | 98 | 100 | 100 | 100 |
| | 20 | 100 | 100 | 100 | 100 |
| | 2.5 | 50 | 50 | 100 | 20 |
| 1-Carbophenoxy-2-trifluoro-methyl-4-nitro-6-chloro benzimidazole | 160 | 100 | 100 | 100 | 100 |
| | 20 | 100 | 100 | 100 | 100 |
| | 2.5 | 80 | 98 | 100 | 90 |

Example 56

An acetone concentrate of each of the compounds indicated below was diluted in water to give solutions containing 30 and 100 parts per million (ppm) of active ingredient. These solutions were sprayed onto 2 cm discs of French bean leaves mounted on wet filter paper and the discs were then covered with adults of greenhouse red spider mite (Tetranychus telarius). With every compound a complete kill of the mites was obtained within 24 hours at both concentrations.

1-carbisopropoxy-4,5,6-trichloro-2-trifluoromethyl-benzimidazole.

1-carbomethoxy-4,5,6-trichloro-2-trifluoromethyl-benzimidazole.

Example 57

An acetone solution of each of the compounds indicated below was sprayed onto 7 cm discs of cabbage leaves so as to give coatings of 3 micrograms of active ingredient per square centimeter. After the solvent had evaporated the discs were placed in 9 cm petri dishes and each infested with 10 second instar larvae of the Cabbage-white butterfly (Pieris brassicae). With every compound complete kill of the larvae was obtained within 24 hours.

1-carbomethoxy-4,5,6-trichloro-2-trifluoromethyl-benzimidazole.

1-carbisopropoxy-4,5,6-trichloro-2-trifluoromethyl-benzimidazole.

1-carbophenoxy-4,5,6-trichloro-2-trifluoromethyl-benzimidazole.

1-carbophenoxy-5-bromo-2-trifluoromethyl-benzimidazole.

EXAMPLE 58

Nine centimeter diameter filter papers were treated with acetone solutions of 1-carbophenoxy-6-chloro-4-nitro-2-trifluoromethyl benzimidazole and when the solvent had evaporated, were placed in crystallizing dishes (9 cm × 4 cm). The concentrations of the solutions were adjusted so that 1 milliliter aliquots deposited on the papers produced deposits equivalent to 30, 10 and 3 mg/sq. meter.

Adult female houseflies (Musca domestica), lightly anaesthetised with carbon dioxide were then introduced into the dishes and a glass lid placed over each. When examined after 24 hours, all treatments were found to have given a complete kill of the insects.

EXAMPLE 59

Filter papers were treated with aqueous sugar solutions containing the sodium salt of the substituted benzimidazole indicated below, so as to give a deposit of the active ingredient of 10 mg/sq.meter.

Adult houseflies (Musca domestica) were transferred to cages containing this filter paper on the floor, and left for 24 hours, and mortality observed. In each case 100 percent mortality was obtained. The papers were stored in the open and at intervals the papers were tested again, to determine the number of days storage required for the mortality to fall at 50 percent. This persistence time in days is given in the table below.

| | |
|---|---|
| 1-carbophenoxy-6-chloro-4-nitro 2-trifluoromethyl benzimidazole | over 57 |
| 1-carboisopropoxy-2,5-bis-(trifluoromethyl) benzimidazole | over 57 |

EXAMPLE 60

The compounds indicated below:

| No | Compounds |
|---|---|
| 1. | 1-carbomethoxy-4,5,6-trichloro-2-trifluoromethyl-benzimidazole. |
| 2. | 1-carboethoxy-4,5,6-trichloro-2-trifluoromethyl-benzimidazole. |
| 3. | 1-carbophenoxy-5-iodo-2-trifluoromethylbenzimidazole |
| 4. | 1-carbophenoxy-4,5,6-trichloro-2-trifluoromethylbenzimidazole |
| 5. | 1-carbophenoxy-6-chloro-4-nitro-2-trifluoromethylbenzimidazole. |
| 6. | 1-carboisopropoxy-6-chloro-4-nitro-2-trifluoromethyl |

7. 1-carbophenoxy-4-chloro-6-nitro-2-trifluoromethyl benzimidazole.
8. 1-carbopropoxy-4,5,6-trichloro-2-trifluoromethyl benzimidazole.

were incorporated into the nutrient medium known as potato-dextrose agar in the molten state at a rate sufficient to produce a final concentration of 30 parts per million weight/volume (p.p.m. w/v) of the medium. The liquid was poured into petri dishes and the cooled culture plates inoculated with mycelial plugs (6 mm. diameter) of a selection from the following species:

| Letter | Species |
|---|---|
| A. | Phytophthora palmivora |
| B. | Alternaria solani |
| C. | Botrytis fabae. |
| D. | Fusarium oxysporum var. cubense |
| E. | Verticillium albo-atrum |
| F. | Fomes annosus |
| G. | Aspergillus niger |
| H. | Cladosporium herbarum |
| I. | Penicillium digitatum |

The plates were cultured for 7 days at 20°C when the colony diameters were measured and compared with the untreated controls. In the following table the reduction in fungal growth is recorded; a dash indicates no test.

| Species | A | B | C | D | E | F | G | H | I |
|---|---|---|---|---|---|---|---|---|---|
| Compound | | | Reduction in fungal growth | | | | | | |
| 1 | over 50% | over 50% | over 50% | over 50% | over 50% | over 50% | — | — | — |
| 2 | " | " | " | " | " | " | — | — | — |
| 3 | " | — | — | " | " | — | over 50% | over 50% | over 50% |
| 4 | " | — | — | " | " | — | " | " | " |
| 5 | " | — | — | " | — | — | " | " | " |
| 6 | — | — | — | — | — | — | " | — | " |
| 7 | over 50% | — | — | — | — | — | " | — | " |
| 8 | — | — | over 50% | over 50% | — | over 50% | — | — | — |

EXAMPLE 61

Aqueous acetone suspensions of 1-carbomethoxy-4,5,6-trichloro-2-trifluoromehtylbenzimidazole containing 500, 250 and 125 parts per million wt./volume together with 500 parts per million of a suitable wetting agent (Lissapol NX) were sprayed on to cucumber plants with two fully expanded true leaves. The treated plants were then placed in a controlled environment chamber together with a number of plants heavily infected with cucumber mildew, Erysiphe cichoracearum, as a source of inoculum.

After 14 days incubation the treatments were found to give 98, 91, and 72 percent protection respectively.

EXAMPLE 62

An aqueous acetone suspension of 1-carbophenoxy-5-iodo-2-trifluoromethylbenzimidazole containing 2000 p.p.m. wt./volume together with 500 p.p.m. of a wetting agent (Lissapol NX) were sprayed on young french bean plants (Phaseolus vulgaris) having two fully expanded leaves. Twenty four hours after treatment the plants were dusted with spores of the bean rust, Uromyces phaseoli. After 10 days incubation in a controlled environment room at 16°C the plants were examined when it was found that the treatment had given 69 percent protection as compared with untreated controls.

EXAMPLE 63

A 1 percent solution of 1-carboisopropoxy-6-chloro-4-nitro-2-trifluoro-methylbenzimidazole in polyethylene glycol (Carbowax 400) was added to a dextrose nutrient broth in quantities sufficient to give 1,000, 200 and 40 p.p.m. w./volume of media. Eight cc aliquots of the treated media were placed in test tubes and 0.2 mls. of a concentrated inoculum of the tomato wilt bacterium, Corynebacterium michiganense added to them. After 7 days incubation at 25°C the broth specimens were examined for signs of bacterial growth. No growth was found in tubes treated with the compound at all levels of concentration.

The process of this example was repeated replacing the 1-carboisopropoxy-6-chloro-4-nitro-2-trifluoromethylbenzimidazole by 5-bromo-1-carbophenoxy-2-trifluoromethylbenzimidazole. No growth was found at the 1,000 and 200 p.p.m. levels of treatment.

EXAMPLE 64

A 1 percent solution of 1-carbophenoxy-5,6-dichloro-2-trifluoromethylbenzimidazole in polyethylene glycol (Carbowax 400) was added to a dextrose nutrient broth in quantities sufficient to give 1,000, 200 and 40 p.p.m. w/v of media. Eight cc aliquots of the treated media were placed in test tubes and 0.2 mls of a concentrated inoculum of Xanthomonas malvacearum (black arm disease of cotton) added to them. After 7 days incobuation at 25°C the broth specimens were examined for signs of bacterial growth. No growth was found in tubes treated with the compound at all levels of concentration.

The process of this example was repeated replacing the 1-carbophenoxy-5,6-dichloro-2-trifluoromethyl-benzimidazole by 1-carboisopropoxy-6-chloro-4-nitro-2-trifluoromethylbenzimidazole. No growth was found at the 200 p.p.m. level of treatment.

EXAMPLE 65

The following emulsifiable oil formulations were made up using the commercially available emulsifying agents as specified

| Formulation A | |
|---|---|
| 1-carbophenoxy-2,5-bis (trifluoromethyl)benzimidazole. | 20 g. |
| Arylan CA (Calcium salt of dodecylbenzene sulphonic acid) | 3.45 g. |
| Sapogenat T 110 (Tributyl phenol condensate with approximately 11 moles of ethyleneoxide) | 1.15 g. |
| Sapogenat T 500 (Tributyl phenol condensate with approximately 50 mols of ethylene oxide) | 1.15 g. |
| Solvent naphtha | to make 100 ml. |

| Formulation B | |
|---|---|
| 1-carbophenoxy-2-trifluoromethyl-4-nitro-6-chloro -benzimidazole | 22 g. |
| Arylan CA | 3.08 g. |
| Sapogenat T 110 | 1.06 g. |
| Sapogenat T 500 | 2.02 g. |
| Petroleum Naphtha | to make 100 ml. |

Formulation C

| | |
|---|---|
| 1-carbophenoxy-2-trifluoromethyl-4-chloro-6-nitro abenzimidazole. | 24.00 g. |
| Arylan CA | 4.00 g. |
| Sapogenat T 110 | 1.76 g. |
| Sapogenat T 500 | 2.24 g. |
| Petroleum Naphtha | to make 100 ml. |

Formulation D

| | |
|---|---|
| 1-carboethoxy-2-trifluoromethyl-5-bromo benzimidazole | 16.0 g. |
| Arylan CA | 0.8 g. |
| Saogenat T 110 | 3.2 g. |
| Petroleum Naphtha | to make 100 ml. |

These formulations were poured into water with agitation, to make emulsions containing 0.133 lb. active ingredient in 1 gallon and sprayed at rates of 30 gallons/acre (4 lb. active ingredient/acre) on to seed pans containing the weed seedlings specified in the table, grown in the greenhouse to three to four true leaves. After 4 days the percentage of the leaf area killed was estimated visually.

| Weed species | Formulations | | | |
|---|---|---|---|---|
| | A | B | C | D |
| Panicum | 57 | 6 | 28 | 97 |
| Setaria | 97 | 53 | 93 | 99 |
| Chickweed | 94 | 38 | 17 | 75 |
| Dock | 96 | 4 | 53 | 96 |
| Cleavers | 89 | 45 | 45 | 73 |
| Mayweed | 99 | 100 | 70 | 98 |

EXAMPLE 66

A wettable powder was made up as follows:

twenty-five parts of 1-carboethoxy-2-trifluoromethyl-5-bromo-benzimidazole two parts of the sulphated dodecylalcohol-ethylene oxide condensation product commercially available as HOE 52/268.

five parts of the sodium sulphate lye commercially available as Wafex.

sixty eight parts of china clay.

This wettable powder was suitable for dispersion in water and spraying.

According to one embodiment of the invention the physiologically active composition also contains another active ingredient such as a herbicide, for example 2-methyl-4-chlorophenoxyacetic acid, 2,4-dichlorophenoxyacetic acid or a triazine; an insecticide, for example DDT or sevin; or a fungicide, for example a dithiocarbamate.

EXAMPLE 67

French beams (Phaseolus vulgaris) plants were sprayed with solutions containing 1,000 parts per million of each of the compounds identified below and 500 parts per million of the non-ionic wetting agent Lissapol NX in aqueous acetone.

At intervals of 1, 3, 7, 10, 14, 21, and 24 days after spraying, 2 cm. diameter leaf discs were cut and each infested with 25 adult red spider mites (Tetranychus telarius). The leaf discs were kept on moist filter paper for 48 hours and after this time the percentage of spider mites dead was observed. Results were as follows:

5,6-Dichloro-1-phenoxycarbonyl-2-trifluoromethyl-benzimidazole, more than 50 percent dead with infestation 24 days after spraying.

4-Bromo-6-chloro-1-ethoxycarbonyl-2-trifluoromethylbenzimidazole, more than 50 percent dead with infestation 10 days after spraying.

6-Bromo-4-chloro-1-ethoxycarbonyl-2-trifluoromethylbenzimidazole, more than 50 percent dead with infestation 24 days after spraying.

6-Bromo-4,5-dichloro-1-isopropoxycarbonyl-2-trifluoromethyl-benzimidazole, more than 50 percent dead with infestation 17 days after spraying.

EXAMPLE 68

French beans (Phaseolus vulgaris) plants were sprayed with solutions containing 1,000 parts per million of each of the compounds identified below and 500 parts per million of the non-ionic wetting agent Lissapol NX in aqueous acetone.

At intervals of 1, 3, 7, 10, 14, 17, 21 and 24 days after spraying, 2 cm. diameter leaf discs were cut and each infested with 10 female adult red spider mites (Tetranychus telarius) and placed on moist filter paper. The adult mites were left on the discs for 24 hours, during which time each laid about 10 eggs (if the adult itself did not die). The adults were then removed and the percentage emergence from the eggs after 7 days was observed. Results were as follows:

5,6-Dichloro-1-phenoxycarbonyl-2-trifluoromethyl-benzimidazole, less than 50 percent emergence with infestation 24 days after spraying.

4-Bromo-6-chloro-1-ethoxycarbonyl-2-trifluoromethylbenzimidazole, less than 50 percent emergence with infestation 7 days after spraying.

4,6-Dibromo-1-isopropoxycarbonyl-2-trifluoromethylbenzimidazole, less than 50 percent emergence with infestation 10 days after spraying.

6-Bromo-4-chloro-1-ethoxycarbonyl-2-trifluoromethylbenzimidazole, less than 50 percent emergence with infestation 10 days after spraying.

EXAMPLE 69

A wettable powder formulation was made up by grinding in a micronizer the following ingredients:

| | |
|---|---|
| 5,6-Dichloro-1-phenoxycarbonyl-2--trifluoromethylbenzimidazole | 25% |
| The condensation product of ethylene oxide with fatty alcohols, known as Hoe S21268. | 3% |
| The sodium salt of the sulphonated cresol/urea/formaldehyde condensation product known as Dyapol PT | 5% |
| China clay | 67% |

EXAMPLE 70

The wettable powder prepared as in Example 3 was dispersed in water to give concentrations of 0.03 percent and 0.05 percent of 5,6-dichloro-1-phenoxy-carbonyl-2-trifluoromethylbenzimidazole. These dispersions were sprayed onto 20 year old apple trees (var. Rome Beauty) in an orchard in South Africa one month before harvesting the apples at a rate of 2 gallons of spray liquid to each tree. Each treatment was replicated four times. Before spraying, and at intervals of 2 days and 7 days after spraying, a random sample of 40 leaves was taken from each tree treated and also from untreated controls and the percentage which were infected with red spider mites (Tetranychus telarius) was noted. The results (averaged for the four replicates of each treatment) are as follows:

| | Before | 2 days after | 7 days after |
|---|---|---|---|

| | spraying | spraying | spraying |
|---|---|---|---|
| 0.05% compound | 59% | 5% | 1% |
| 0.03% compound | 73% | 8% | 0% |
| Control | 68% | 72% | 93% |

EXAMPLE 71

French beans (*Phaseolus vulgaris*) plants were sprayed with solutions containing 1,000 parts per million of each of the compounds identified below and 500 parts per million of the non-ionic wetting agent Lissapol NX in aqueous acetone.

At intervals of numbers of days after spraying 2 cm. diameter leaf discs were cut and each infested with 25 adult red spider mites (*Tetranychus telarius*). The leaf discs were kept on moist filter paper for 48 hours and after this time the percentages of spider mites dead was recorded. In the table below is given for each compound the number of days after spraying when test discs were cut and infested and more than 50 percent mortality of the mites was observed.

4-bromo-6-chloro-1-isopropoxycarbonyl-2-trifluoromethyl-benzimidazole — 10 days,
5-cyano-1-isopropoxycarbonyl-2-trifluoromethyl-benzimidazole — 10 days,
6-bromo-4,5-dichloro-1-ethoxycarbonyl-2-trifluoromethyl-benzimidazole — 24 days,
5,6-dichloro-1-ethoxycarbonyl-2-trifluoromethyl-benzimidazole — 7 days,
5,6-dichloro-1-methoxycarbonyl-2-trifluoromethyl-benzimidazole — 7 days,
6-chloro-4-nitro-1-ethoxycarbonyl-2-trifluoromethyl-benzimidazole — 17 days,
4-chloro-6-iodo-1-ethoxycarbonyl-2-trifluoromethyl-benzimidazole — 10 days,
5,6-dichloro-1-cyclohexyloxycarbonyl-2-trifluoromethyl-benzimidazole — 14 days,
6-bromo-4,5-dichloro-1-(2'-chloroethoxycarbonyl)-2-trifluoromethyl-benzimidazole — 10 days,
4,5-dichloro-1-methoxycarbonyl-2-trifluoromethyl-benzimidazole — 10 days,
4,5-dichloro-1-cyclohexyloxycarbonyl-2-trifluoromethyl-benzimidazole — 10 days,
4,5,6-trichloro-1-cyclohexyloxycarbonyl-2-trifluoromethyl-benzimidazole — 24 days,
4,5-dichloro-1-hexyloxycarbonyl-2-trifluoromethyl-benzimidazole — 10 days,
4,5,6-trichloro-1-alpha-naphthyloxycarbonyl-2-trifluoromethyl-benzimidazole — 10 days,
4,6-dichloro-1-phenoxycarbonyl-2-trifluoromethyl-benzimidazole — 10 days,
4-bromo-5,6-dichloro-1-ethoxycarbonyl-2-trifluoromethyl-benzimidazole — 17 days,
4-bromo-5,6-dichloro-1-pentyloxycarbonyl-2-trifluoromethyl-benzimidazole — 10 days,
4-bromo-5,6-dichloro-1-propyloxycarbonyl-2-trifluoromethyl-benzimidazole — 14 days,
6-chloro-4-nitro-1-decyloxycarbonyl-2-trifluoromethyl-benzimidazole — 10 days,
6-chloro-4-nitro-1-isopropoxycarbonyl-2-trifluoromethyl-benzimidazole — 10 days,
4,5-dichloro-1-ethoxycarbonyl-2-trifluoromethyl-benzimidazole — 7 days,
4,5-dichloro-1-isopropoxycarbonyl-2-trifluoromethyl-benzimidazole — 7 days,
5-nitro-1-isopropoxycarbonyl-2-trifluoromethyl-benzimidazole — 35 days,
4,6-dibromo-1-ethoxycarbonyl-2-trifluromethyl-benzimidazole — 24 days,
4-bromo-6-chloro-1-phenoxycarbonyl-2-trifluoromethyl-benzimidazole — 10 days.

We claim:

1. A benzimidazole of the formula

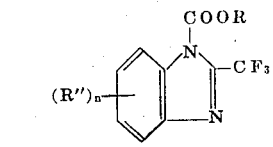

wherein R is a member selected from group consisting of alkyl of one to 12 carbon atoms, halo substituted lower alkyl, phenyl, lower alkylphenyl, naphthyl, and cyclohexyl, and wherein
R" is a member selected from the group consisting of halo, nitro, and cyano, and wherein
n is an integer of 1 to 4.

2. A substituted benzimidazole compound of the formula

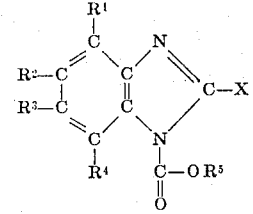

wherein X represents a member selected from the group consisting of trifluoromethyl and pentafluoroethyl,
$R^1$, $R^2$, $R^3$ and $R^4$ are independently selected from the group consisting of hydrogen, alkyl of one to six carbon atoms, nitro, halogen, cyano and halosubstituted lower alkyl,
$R^5$ represents a member selected from the group consisting of alkyl of one to 12 carbon atoms, halo substituted lower alkyl, phenyl, lower alkylphenyl, naphthyl and cyclohexyl.

3. A compound of the formula:

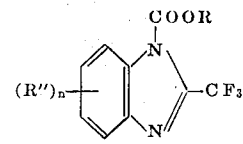

where R" is halogen and R is a member of the group consisting of alkyl of one to six carbon atoms and phenyl and n is an integer of 1 to 3.

4. 5,6-dichloro-1-phenoxycarbonyl-2-trifluoromethylbenzimidazole
5. 1-carbophenoxy-2,5-bis(trifluoromethyl)benzimidazole
6. 4,5,6-trichloro-1-cyclohexyloxycarbonyl-2-trifluoromethyl-benzimidazole.
7. 1-carboisopropoxy-4,5,6-trichloro-2-trifluoromethylbenzimidazole,
8. 4-bromo-6-chloro-1-ethoxycarbonyl-2-trifluoromethylbenzimidazole.
9. 4,6-dibromo-1-isopropoxycarbonyl-2-trifluoromethylbenzimidazole.
10. 6-bromo-4-chloro-1-ethoxycarbonyl-2-trifluoromethylbenzimidazole.
11. 6-bromo-4,5-dichloro-1-isopropoxycarbonyl-2-trifluoromethyl-benzimidazole.

* * * * *